United States Patent Office 3,037,848
Patented June 5, 1962

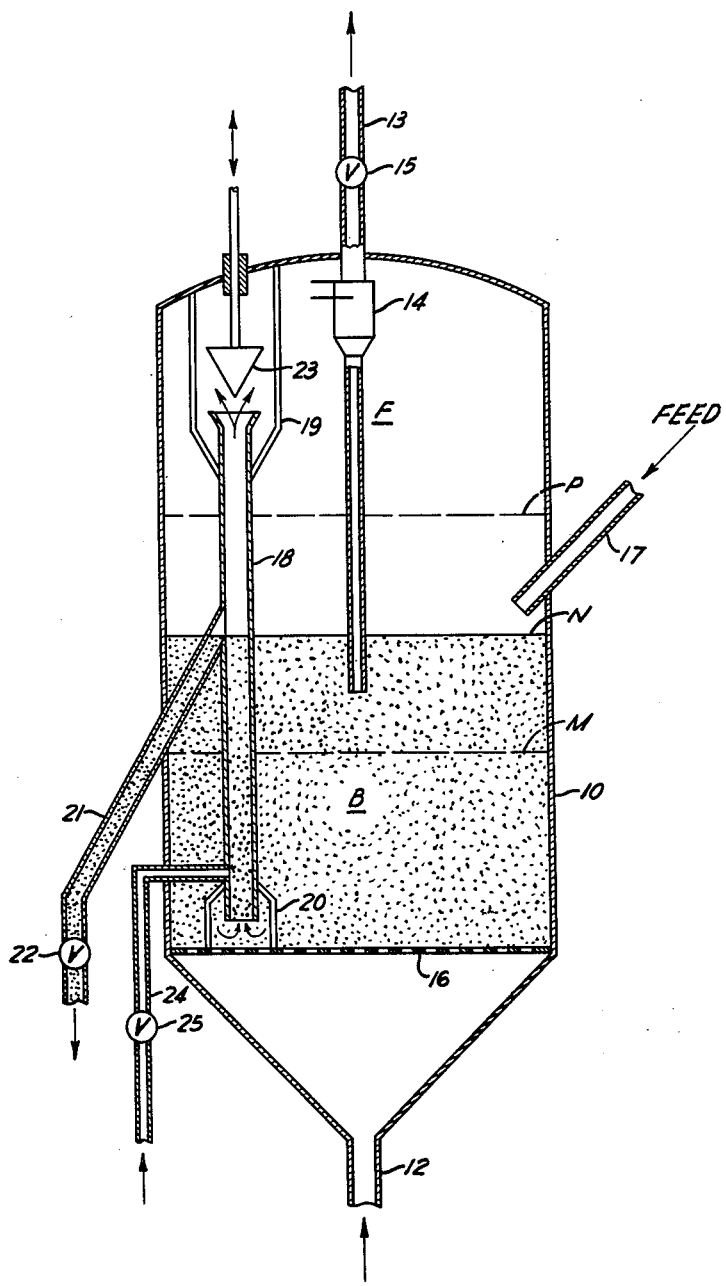

3,037,848
FLUIDIZED-BED REACTOR
William L. Davis, Jr., Monroeville, Pa., assignor to United States Steel Corporation, a corporation of New Jersey
Filed Oct. 16, 1958, Ser. No. 767,557
2 Claims. (Cl. 23—284)

This invention relates to an improved solids discharge device for a fluidized bed reactor.

The present application is a continuation-in-part of my earlier application Serial No. 696,752, filed November 15, 1957, now abandoned.

In a conventional fluidized bed reactor in which the bed has a depth-to-diameter ratio no greater than about 10/1, solids mix in all directions so rapidly and completely that the bed becomes almost uniform throughout its mass. In a reactor which receives and discharges solids on a continuous basis, the gradient in composition of the solids is small between the feed and discharge points. Consequently some particles discharge incompletely reacted, and a few actually may pass directly from the feed to the discharge unaffected by the intended reaction within the bed. Gas flows vertically upward through such a reactor. Particles near the bottom of a bed at any instant are in contact with fresh gas whose active constituents are at maximum concentration, while those near the top are in contact with gas whose active constituents are largely spent. Therefore, whatever small gradient does exist favors more completely reacted particles at the bottom.

An object of my invention is to provide an improved solids discharge device which minimizes chances of incompletely reacted particles being discharged from a fluidized bed.

A further object is to provide a solids discharge device which takes solids from the most completely reacted region of a bed and affords further opportunity for them to react before actually removing them from the reactor.

A further object is to provide an improved solids discharge device which facilitates both adjustment in the depth of bed in a reactor and removal of the entire bed when necessary.

A further object, as distinguished from my earlier application, is to provide an improved solids discharge device which enables the depth of bed to be adjusted downwardly from a predetermined normal level, as well as upwardly.

In accomplishing these and other objects of the invention, I have provided improved details of structure, a preferred form of which is shown in the accompanying drawing, in which:

The single FIGURE is a diagrammatic vertical sectional view of a reactor equipped with a discharge device in accordance with my invention.

The FIGURE shows a fluidized bed reactor 10, which apart from my novel discharge device, can be of conventional construction. A gas inlet 12 leads to the bottom of the reactor and a gas outlet 13 extends from the top. The outlet is equipped with a conventional cyclone dust collector 14 and a shutoff valve 15, which is always open during operation of the reactor and is closed only when the contents of the reactor are to be emptied, as hereinafter explained. A perforate horizontal partition 16 extends across the lower portion of the reactor above the gas inlet and supports a fluidized bed B of finely divided solid particles. The reactor has a freeboard space F above the bed. Solids enter the bed through any conventional feeder indicated diagrammatically at 17. If solids enter the reactor 10 from a preceding similar reactor, the feeder commonly is a vertical pipe extending downwardly from the other reactor; otherwise the feeder may be a screw conveyor or a sloping pipe. The feeder preferably introduces solids near one side wall of the reactor, and when used in combination with my discharge device, near the top of the bed.

My novel discharge device comprises a vertical pipe 18 which is located at the side of the reactor opposite the feeder and extends from the bottom of the bed B just above partition 16 to a height within the freeboard F well above the maximum height of the bed. Pipe 18 has a minimum diameter of about 2 inches enabling solids therein to remain fluidized, but has a relatively large height-to-diameter ratio to minimize vertical back-mixing of solids therein. The pipe can be supported within the reactor in any suitable way, such as by braces 19 depending from the top wall of the reactor and braces 20 upstanding from partition 16. A downwardly sloping overflow pipe 21 extends from the intermediate portion of pipe 18 through the side wall of the reactor. The effective height-to-diameter ratio of pipe 18 measured from its lower end to the overflow pipe 21 should be at least 10/1 and preferably in the range 15/1 to 20/1. Preferably the overflow contains a shutoff valve 22. Preferably a cone-type plug valve 23 is mounted for vertical movement above the upper end of pipe 18 and is adapted to restrict flow of gas from the pipe for adjusting the bed depth upwardly from its normal level or for emptying the reactor, as hereinafter explained. Preferably also an inlet pipe 24, which contains a normally closed valve 25, leads to the lower portion of pipe 18 and is adapted to admit gas for adjusting the bed depth downwardly from its normal level.

In operation, finely divided solids feed into reactor 10 through the feeder 17, while gas enters through inlet 12, flows upwardly through partition 16 and bed B, and leaves through outlet 13, all in the usual fashion. Valves 15 and 22 of course are open in order not to interfere with escape of gas and solids from the reactor. The gas fluidizes the solids in bed B and at the same time reacts in some way therewith. For example, the solids feeding into the reactor can be iron oxide, the gas a reductant therefor, and the solids discharging from the reactor a reduced product, such as metallic iron or a lower oxide. The solids and/or gas can be preheated if required for the reaction, or the reactor can be equipped with heating or cooling means if needed, all of which are known expedients in the art. Solids near the bottom of the bed enter the lower end of pipe 18. As already explained, solids in this region tend to be the most completely reacted. Upcurrents of gas also enter this pipe and maintain solids therein fluidized and tend to react further therewith as the gas and solids flow upwardly together. Since pipe 18 has a large effective depth-to-diameter ratio which limits vertical back-mixing, particles in the upper portion of the bed within the pipe now tend to be the most completely reacted. These particles overflow through the overflow pipe 21 for appropriate subsequent treatment.

If valve 23 is positioned far enough above pipe 18 not to restrict escape of gas and valve 25 is closed, the top of bed B remains at a normal level N even with the line along which the overflow 21 intersects pipe 18. When a different depth bed is desired, valve 23 or 25 is adjusted to change the pressure drop of gas passing through pipe 18. The pressure drop through bed B of course adjusts itself so that it again becomes equal to that through pipe 18; hence such adjustment changes the level of bed B to equalize the two pressure drops. To raise the bed depth above the normal level N, valve 23 is lowered to where it restricts escape of gas from pipe 18, thus increasing the pressure drop through this pipe. The immediate effect is to lower the depth of solids in pipe 18 below the overflow 21; solids actually return from pipe 18 into bed B. As solids continue to enter bed B through the feeder 17, the bed depth and the pressure drop therethrough increase. Solids again flow up pipe 18 to balance the increased pressure drop and again reach the level of the overflow pipe. Solids in the bed B remain at a sufficiently greater depth P to balance the added pressure drop caused by restriction to flow past valve 23. As shown in the drawing, the level P is lower than the upper end of pipe 18, whereby the upper end of the pipe always remains within the freeboard F. To lower the bed depth below the normal level N, valve 25 is opened to inject a supplementary supply of gas into pipe 18. The added flow increases the superficial gas velocity in pipe 18 and thus lowers the apparent density of solids therein. Since the solids level in pipe 18 cannot rise above the overflow 21, the immediate effect is to decrease the pressure drop through pipe 18 to a value less than the pressure drop through bed B, whereupon solids flow rapidly from bed B into pipe 18. The bed depth drops rapidly to a lower equilibrium level M. Control of the extent to which valve 23 restricts flow from the top of pipe 18 or control of the volume of supplementary gas regulates the location of the levels P and M.

If it is necessary to empty the reactor completely, feeding is stopped and valves 15, 23 and 25 fully closed. Gas continues to enter the reactor through inlet 12 and causes pressure within the reactor to increase. The pressure increase can be relieved only by escape of gas through the overflow pipe 21. In thus escaping, the gas carries solids from the bed after the fashion of a dense phase pneumatic conveyor.

From the foregoing description, it is seen that my invention affords a discharge device that not only increases the degree to which particles leaving a fluidized bed have been reacted, but also improves and simplifies control of bed depth either upwardly or downwardly from a normal level. The use of valves 23 and 25 as means for adjusting the bed depth greatly simplifies this adjustment. In conventional equipment it is usually necessary to change the height of an overflow, a much more cumbersome operation. Nevertheless it is apparent my discharge device can be used without the means for adjusting the bed level or that either of the two level-adjusting means can be used without the other. The construction is simple and readily applied to existing installations.

While I have shown and described only a single embodiment of my invention, it is apparent that other modifications may arise. Therefore, I do not wish to be limited to the disclosure set forth but only by the scope of the appended claims.

I claim:

1. In a reactor which includes walls forming an upright chamber, a perforate horizontal partition extending across the lower portion of said chamber for supporting a fluidized bed of finely divided solids and permitting vertical back mixing thereof, which bed has predetermined normal, minimum and maximum operating levels, said chamber having a freedboard space above the bed when the bed is at any of its operating levels, means for feeding solids to the upper portion of the bed, and means for passing upcurrents of a fluidizing gas through said partition and thence through the bed to react with the solids therein, said chamber having an outlet for the gas above the bed, the combination therewith of a discharge device comprising tubular means supported within said chamber and having a lower end above said partition near the bottom of the space occupied by the bed and an upper end in said freeboard space above the maximum operating level of the bed, both ends of said tubular means being open allowing solids from the bottom portion of the bed to enter directly and also allowing fluidizing gas to pass therethrough and continue its reaction with solids which have entered the tubular means, thus carrying the reaction more nearly toward completion, the diameter and length of said tubular means being of a relative magnitude to permit fluidization of solids therein but limiting vertical back mixing, an overflow for solids connected to the intermediate portion of said tubular means and extending outside said chamber, the level of the connection of said overflow to said tubular means defining the normal operating level of the bed, and a valve adapted to close partially the upper end of said tubular means for restricting escape of gas therefrom and thus adjusting the bed level upwardly from the normal level.

2. A combination as defined in claim 1 including an inlet for introducing a supplementary supply of gas to the lower portion of said tubular means, said valve and said inlet cooperating respectively to raise or to lower the pressure drop of gas passing through said tubular means, thereby raising or lowering the depth of bed in said reactor from said normal level.

References Cited in the file of this patent

UNITED STATES PATENTS

| 2,212,120 | Kneale | Aug. 20, 1940 |
| 2,535,140 | Kassel | Dec. 26, 1950 |
| 2,586,818 | Harms | Feb. 26, 1952 |
| 2,684,890 | Lapple | July 27, 1954 |
| 2,715,018 | Lapple | Aug. 9, 1955 |
| 2,723,838 | Peters | Nov. 15, 1955 |
| 2,743,998 | Swart et al. | May 1, 1956 |

FOREIGN PATENTS

| 574,064 | Great Britain | Dec. 19, 1945 |